(12) United States Patent
Yamamoto et al.

(10) Patent No.: US 8,399,091 B2
(45) Date of Patent: Mar. 19, 2013

(54) PRESSURE-SENSITIVE ADHESIVE SHEET

(75) Inventors: Kenichi Yamamoto, Ibaraki (JP); Toshihide Suzuki, Ibaraki (JP); Shouhei Wada, Ibaraki (JP); Mitsuyoshi Shirai, Ibaraki (JP); Akiko Takahashi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 140 days.

(21) Appl. No.: 12/791,677

(22) Filed: Jun. 1, 2010

(65) Prior Publication Data

US 2010/0310866 A1 Dec. 9, 2010

(30) Foreign Application Priority Data

Jun. 5, 2009 (JP) ................. 2009-135881

(51) Int. Cl.
*B32B 7/12* (2006.01)

(52) U.S. Cl. .......... 428/355 AC; 428/343; 428/344; 428/355 R; 428/40.1; 428/41.8; 526/329.7; 526/328.5

(58) Field of Classification Search .............. None
See application file for complete search history.

(56) References Cited

U.S. PATENT DOCUMENTS

| | | | |
|---|---|---|---|
| 2002/0098352 A1* | 7/2002 | Kishioka | 428/352 |
| 2003/0212162 A1* | 11/2003 | Uesugi et al. | 522/31 |
| 2007/0207312 A1* | 9/2007 | Ikeya et al. | 428/355 AC |
| 2008/0033096 A1 | 2/2008 | Takahashi et al. | |
| 2009/0095516 A1 | 4/2009 | Daigaku et al. | |
| 2009/0137727 A1 | 5/2009 | Takahashi et al. | |
| 2011/0086219 A1 | 4/2011 | Ikeya et al. | |

FOREIGN PATENT DOCUMENTS

| | | |
|---|---|---|
| CN | 101029210 | 9/2007 |
| CN | 101407705 | 4/2009 |
| CN | 101440265 | 5/2009 |
| JP | 61-012775 A | 1/1986 |
| JP | 2008-037960 | 2/2008 |

OTHER PUBLICATIONS

State Intellectual Property Office of the People'S Republic of China, Office Action in Chinese Patent Application No. 201010198286.0 (Oct. 31, 2012) English translation.

* cited by examiner

*Primary Examiner* — Jennifer Chriss
*Assistant Examiner* — Anish Desai
(74) *Attorney, Agent, or Firm* — Leydig, Voit & Mayer, Ltd.

(57) ABSTRACT

An adhesive sheet is provided in which properties that cause corrosion of a non-contacting metal are inhibited. The adhesive sheet is provided with a pressure-sensitive adhesive layer formed from an aqueous dispersion type adhesive composition. The pressure-sensitive adhesive composition contains an aqueous dispersion type acrylic polymer synthesized using a chain transfer agent that does not have sulfur as a composite element thereof. The amount of sulfur-containing gas (as $SO_4^{2-}$) released from the pressure-sensitive adhesive sheet in the case of heating for 1 hour at 85° C. is 0.043 µg/1 cm² or less, adhesive strength on an ABS sheet is 10 N/20 mm or more, and holding time as determined in an 80° C. cohesive strength test is 1 hour or more.

7 Claims, 3 Drawing Sheets

PRESSURE-SENSITIVE ADHESIVE SHEET

BACKGROUND OF THE INVENTION

1. Field of the Invention

The present invention relates to an aqueous dispersion type pressure-sensitive adhesive (PSA) composition having an acrylic polymer as the base polymer thereof, and to a PSA sheet that uses the PSA composition.

The present application claims priority on the basis of Japanese Patent Application No. 2009-135881, filed on Jun. 5, 2009, the entire content of which is incorporated herein by reference.

2. Description of the Related Art

Since PSA compositions using an aqueous dispersion type acrylic polymer use no organic solvent as a dispersion medium, they are desirable from the viewpoint of environmental health and safety in comparison with PSA compositions of the type in which the PSA component is dissolved in an organic solvent. Consequently, PSA sheets using an aqueous dispersion type acrylic PSA composition have come to be used in the form of double-sided adhesive type (such as mounting tape) and other forms in various fields. Examples of application fields include various types of electronic equipment such as home appliances and OA equipment. An example of technical literature relating to a PSA that uses an acrylic emulsion is Japanese Patent Application Laid-open No. S61-12775.

SUMMARY OF THE INVENTION

However, PSA sheets formed from an aqueous dispersion type acrylic PSA composition may cause corrosion of metals (such as silver) not in direct contact with the PSA sheet. For example, under conditions in which a PSA sheet and metal material are both present in a confined space within the casing of electronic equipment, the PSA sheet may cause corrosion of the non-contacting metal material. This phenomenon can be a factor that brings about defective contact due to corrosion of metal that composes boards, wiring and so forth of electronic equipment. In addition, this corrosion of metal can also cause problems such as material deterioration (such as metal fatigue) or decreased aesthetic quality in fields other than electronic equipment. Thus, a PSA sheet is desired that does not cause corrosion of metal.

In order to solve the problems of the related art as described above, an object of the present invention is to provide a PSA sheet that uses an aqueous dispersion type acrylic PSA composition and inhibits corrosion of non-contacting metal as described above.

Based on the supposition that the phenomenon in which a PSA sheet causes corrosion of a non-contacting metal is brought about by the release of metal corrosive substances from the PSA sheet, the inventors of the present invention focused on sulfur-containing gas (namely, gas containing sulfur as composite elements thereof) as the metal corrosive substance. Moreover, in the production (typically by emulsion polymerization) of acrylic polymer emulsions for use as PSAs, sulfur compounds widely used as chain transfer agents (sulfur-containing chain transfer agents, and typically n-lauryl mercaptan) have been determined to be the major generation source of the above-mentioned sulfur-containing gas. Thus, the problem of generation of sulfur-containing gas attributable to the above-mentioned sulfur-containing chain transfer agents is thought to be able to be fundamentally solved by not using these sulfur compounds. In general, however, if polymerization is carried out without using a chain transfer agent, it becomes difficult to adjust the molecular weight of the acrylic polymer (with the molecular weight typically becoming excessively high), thereby making it difficult to realize a high level of various types of adhesive properties in the proper balance in a PSA that uses the resulting polymer. The inventors of the present invention found that by using a chain transfer agent that does not have sulfur as a composite element thereof (sulfur-free chain transfer agent) for the chain transfer agent used for production of an acrylic polymer emulsion as described above, the above-mentioned problem of metal corrosion can be solved while permitting the use of a chain transfer agent, thereby leading to completion of the present invention.

The present invention provides a PSA sheet comprising a PSA layer formed from an aqueous dispersion type PSA composition. The PSA composition contains an aqueous dispersion type acrylic polymer that was synthesized using a chain transfer agent not having sulfur as a composite element thereof (to also be referred to as a "sulfur-free chain transfer agent"). The PSA sheet (such as a double-sided PSA sheet provided with the PSA layer on each side of a substrate) is characterized by satisfying all of the following properties of A to C:

property A: 180° peel strength on an acrylonitrile-butadiene-styrene copolymer resin sheet (ABS sheet) is 10 N/20 mm or more;

property B: holding time in an 80° C. cohesive strength (holding power) test is 1 hour or more, or in other words, when a test piece affixed to an adherend is subjected to a load and allowed to stand in an environment at 80° C. for 1 hour, the test piece does not fall from the adherend; and, property C: an amount of gas containing sulfur, as a composite element (sulfur-containing gas), that is released in a gas generation test of heating the PSA sheet at 85° C. for 1 hour is 0.043 µg or less as $SO_4^{2-}$ per square centimeter ($cm^2$) of the PSA sheet surface area (to also be expressed as "0.043 µg $SO_4^{2-}/cm^2$ or less").

According to this PSA sheet, since the use of a chain transfer agent is permitted when synthesizing the aqueous dispersion type acrylic polymer used to form the PSA layer, the polymer can be easily adjusted to a suitable molecular weight. According to a PSA composition containing an acrylic polymer adjusted to a suitable molecular weight, a high-performance PSA sheet can be formed that simultaneously satisfies the above properties A and B. In addition, since a sulfur-free chain transfer agent is used for the chain transfer agent, the generation of sulfur-containing gas originating in the chain transfer agent (and particularly gas such as $H_2S$ or $SO_2$ that is able to form sulfides by reacting with a metal such as silver) can be reliably prevented. Thus, according to the present invention, a PSA sheet can be provided that does not have the property of corroding non-contacting metal as described above, or only has that property at an extremely low level (namely, demonstrates superior metal corrosion preventability), while demonstrating satisfactory adhesion performance.

In a preferable embodiment of the PSA sheet disclosed here, the PSA sheet further satisfies at least one of the following properties D to F:

property D: in a metal corrosion test in which 1 g of the PSA sheet and a silver plate are placed in a vessel having a volume of 50 mL so that they mutually do not make contact, and in which the vessel is then sealed and stored for 1 week at 85° C., no corrosion of the silver plate occurs;

property E: 180° peel strength on a polypropylene resin sheet (PP sheet) is 10 N/20 mm or more; and, property F: in a curved surface adhesion test in which a test piece, obtained by backing a PSA sheet having a width of 10 mm and length of 90 mm with an aluminum plate having a thickness of 0.5 mm, is wrapped around a cylindrical column having a diameter of 40 mm for 5 seconds to be bent on the aluminum plate side followed by pressing the test piece onto a polypropylene sheet and holding for 24 hours in an environment at 23° C. and 50% RH and then for 2 hours in an environment at 70° C., the distance that the ends of the test piece lift from the surface of the polypropylene sheet is 8 mm or less.

Preferable examples of the sulfur-free chain transfer agent used in the art disclosed here include N,N-dialkylanilines, compounds having a benzylidenyl group ($C_6H_5$—CH=), non-conjugated cycloalkyldienes and 2,3-dimethyl-2-butene. One type or two or more types selected from these sulfur-free chain transfer agents can be used preferably. These chain transfer agents are suitable for synthesizing an acrylic polymer adjusted to a suitable molecular weight. According to a PSA composition containing such an acrylic polymer, a PSA sheet can be formed that has superior metal corrosion preventability while demonstrating satisfactory adhesion performance.

An example of a preferable application of the art disclosed here is a double-sided PSA sheet provided with the PSA layer on each side of a substrate. In a PSA sheet employing this composition, adjusting the molecular weight of the acrylic polymer is particularly important. Thus, it is of particular significance that a chain transfer agent can be used when synthesizing an aqueous dispersion type acrylic polymer.

As was previously described, since the amount of metal corroding gas released is extremely low in a PSA sheet provided by the art disclosed here, it is preferable for use as a PSA sheet used inside electronic equipment. For example, it can be preferably used as a PSA sheet used for bonding in an internal space where metal materials such as circuit boards and wiring are also present. Thus, in another aspect thereof, the present invention provides electronic equipment having locations bonded by the above-mentioned PSA sheet therein.

DETAILED DESCRIPTION OF THE INVENTION

The following provides an explanation of preferred embodiments of the present invention. Furthermore, matters required for carrying out the present invention other than those matters specifically mentioned in the present description can be understood as design matters of a person with ordinary skill in the art based on the related art in the field. The present invention can be carried out based on contents disclosed in the present description and matters of technical common sense in the field. In addition, in the following explanations, the same reference symbols are used to indicate those members or sites that demonstrate similar actions, and duplicate explanations thereof are either omitted or simplified.

The PSA sheet provided by the present invention is provided with a PSA layer formed from any of the aqueous dispersion type PSA compositions disclosed herein. The PSA sheet may be a PSA sheet with a substrate (support) in a form having the PSA layer on one side or each side of the substrate, or may be an substrate-free PSA sheet such as a form in which the PSA layer is retained on a release liner (which can also be understood to be a "substrate provided with a release surface"). The concept of a PSA sheet as referred to herein includes so-called PSA tape, PSA label or PSA film and the like. Furthermore, although the PSA layer is typically formed continuously, it is not limited to this form, but rather may also be a PSA layer formed into a regular or random pattern such as dots or stripes. In addition, the PSA sheet provided by the present invention may be in the form of a roll or individual sheets. Alternatively, it may also be a PSA sheet processed into various shapes.

Figure 1:
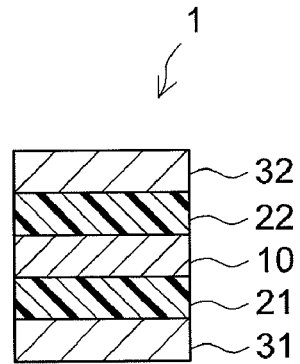
FIG. 1 is a cross-sectional view schematically showing an example of the composition of the PSA sheet according to the present invention.
Figure 2:
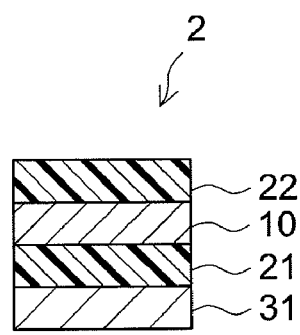
FIG. 2 is a cross-sectional view schematically showing another example of the composition of the PSA sheet according to the present invention.

The PSA sheet disclosed here can have a cross-sectional structure schematically indicated in FIGS. 1 to 6, for example. Among these, FIGS. 1 and 2 show examples of the composition of a PSA sheet with substrate of the double-sided adhesive type. An PSA sheet 1 shown in FIG. 1 is provided with PSA layers 21 and 22 on both sides of a substrate 10 (of which both are non-releasing), and the PSA layers have a configuration in which they are respectively protected by release liners 31 and 32 of which at least the PSA layer side serves as a release side. An PSA sheet 2 shown in FIG. 2 is provided with PSA layers 21 and 22 on respective sides of the substrate 10 (of which both sides are non-releasing), and of them, the PSA layer 21 has a configuration in which it is protected by the release liner 31 of which both sides serve as release sides. This type of PSA sheet 2 can also employ a configuration in which the other PSA layer 22 is also protected by the release liner 31 by winding the PSA sheet and causing the PSA layer 22 to contact the back of the release liner 31.

Figure 3:
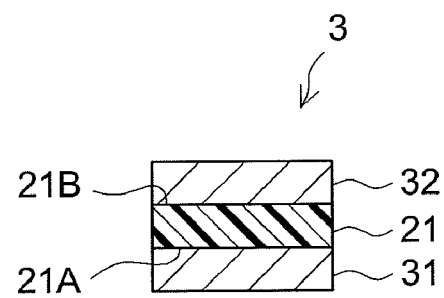
FIG. 3 is a cross-sectional view schematically showing another example of the composition of the PSA sheet according to the present invention.
Figure 4:
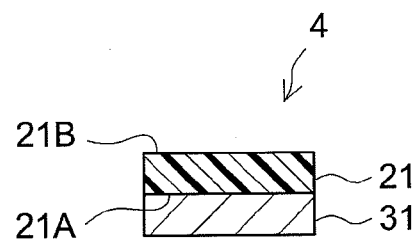
FIG. 4 is a cross-sectional view schematically showing another example of the composition of the PSA sheet according to the present invention.

FIGS. 3 and 4 indicate examples of the composition of substrate-free, double-sided PSA sheets. An PSA sheet 3 shown in FIG. 3 has a configuration in which both sides 21A and 21B of a substrate-free PSA layer 21 are respectively protected by release liners 31 and 32 of which at least the PSA layer side serves as a release side. An PSA sheet 4 shown in FIG. 4 has a configuration in which one side 21A of the substrate-free PSA layer 21 is protected by the release liner 31 of which both sides serve as release sides, and when this is wound, a configuration can be employed in which the other side 21B of the PSA layer 21 is also protected by the release liner 31 as a result of the other side 21B of the PSA layer 21 contacting the back of the release liner 31.

Figure 5:
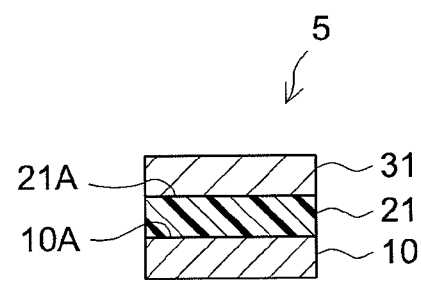
FIG. 5 is a cross-sectional view schematically showing another example of the composition of the PSA sheet according to the present invention.
Figure 6:
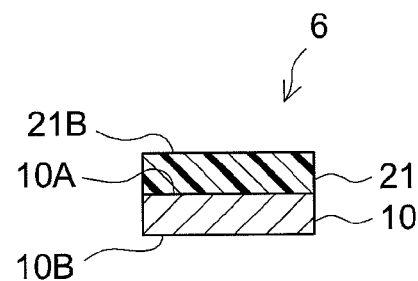
FIG. 6 is a cross-sectional view schematically showing another example of the composition of the PSA sheet according to the present invention.

FIGS. 5 and 6 show examples of the composition of PSA sheets with substrate of the single-sided PSA type. An PSA sheet 5 shown in FIG. 5 is provided with the PSA layer 21 on one side 10A (non-releasing) of the substrate 10, and has a configuration in which the top surface (adhesive side) 21A of the PSA layer 21 is protected by the release liner 31 of which at least the PSA layer side serves as a release side. An PSA sheet 6 shown in FIG. 6 has a configuration in which the PSA layer 21 is provided on one side 10A (non-releasing) of the substrate 10. The other side 10B of the substrate 10 is a release side, and when the PSA sheet 6 is wound, the top surface (adhesive side) 21B of the PSA layer is protected by the other side 10B of the substrate as a result of the PSA layer 21 contacting the other side 10B.

In the PSA sheet provided by the art disclosed here, the amount of sulfur-containing gas that is released in a gas generation test wherein the PSA sheet is heated at 85° C. for 1 hour is 0.043 µg $SO_4^{2-}/cm^2$ or less (and preferably 0.03 µg $SO_4^{2-}/cm^2$ or less) (property C), while also satisfying the above-mentioned properties A and B (and preferably further satisfying at least one of the properties D to G). In this manner, a PSA sheet having superior metal corrosion preventability and adhesive properties is preferable as a PSA sheet used inside electronic equipment, for example.

The amount of sulfur-containing gas released as described above can be calculated by, for example, determining the weight of sulfur-containing gas (which can be $H_2S$ or $SO_2$ and the like) as $SO_4^{2-}$ released from the PSA sheet in a gas generation test wherein the PSA sheet is heated for 1 hour at 85° C., and dividing that weight by the surface area of the PSA sheet. More specifically, the amount of sulfur-containing gas released can be determined by, for example, a sulfur-containing gas release measurement method described in the subsequently described examples. In a preferable aspect of the present invention, the amount of sulfur-containing gas released from the PSA sheet is essentially zero (for example, below the detection limit, and typically less than 0.02 µg $SO_4^{2-}/cm^2$, during measurement of the amount of sulfur-containing gas released using for the measurement sample about 0.1 g of PSA sheet as will be described later).

In a preferable aspect of the PSA sheet disclosed here, there is no corrosion observed on a silver plate in a metal corrosion test in which 1 g of the PSA sheet and a silver plate (using, for example, a silver plate composed of silver having purity of greater than 99.95% and having a size of 1 mm×10 mm×10 mm) are placed in a vessel having a volume of 50 mL while preventing from making mutual contact, the vessel is sealed, and the vessel is stored for 1 week at 85° C. (and more specifically, a metal corrosion test that is carried out according to, for example, the procedure described in the subsequently described examples) (property D). In this manner, a PSA sheet having superior metal corrosion preventability is particularly preferable as a PSA sheet used inside electronic equipment. Furthermore, "not corroding a silver plate" in the present invention refers to not observing any changes in appearance (such as loss of metal luster or coloring) when a visual comparison is made between the silver plate after the above-mentioned metal corrosion test (after the passage of 1 week) and an unused (prior to testing) silver plate.

ABS adhesive strength and PP adhesive strength of a PSA sheet (typically a double-sided PSA sheet) can be determined by measuring ABS adhesive strength and PP adhesive strength as described in the subsequently described examples. In addition, cohesive strength of the PSA sheet can be determined by measuring cohesive strength as described in the subsequently described examples. Curved surface adhesion of the PSA sheet can be determined by evaluating curved surface adhesion as described in the subsequently described examples.

In the PSA sheet disclosed herein with respect to property A, the 180° peel strength on an ABS sheet (to simply also be referred to as ABS adhesive strength) is more preferably 13 N/20 mm or more and even more preferably 14.5 N/20 mm or more. Although there are no particular limitations on the upper limit of ABS adhesive strength, in the case the fracture mode during measurement is interface fracture, ABS adhesive strength is normally roughly 30 N/20 mm or less. In addition, with respect to property B, the amount of deviation of the PSA sheet (test piece) after allowing to stand for 1 hour in an environment at 80° C. is more preferably 3 mm or less and even more preferably 1.5 mm or less.

In the PSA sheet disclosed herein with respect to property E, the 180° peel strength for a PP sheet (to simply also be referred to as PP adhesive strength) is preferably 10 N/20 mm or more and more preferably 12 N/20 mm or more. Although there are no particular limitations on the upper limit of PP adhesive strength, in the case the fracture mode during measurement is interface fracture, PP adhesive strength is normally roughly 25 N/20 mm or less. In addition, with respect to property F, the lifting distance from a PP sheet is preferably 8 mm or less, more preferably 6 mm or less, and even more preferably 4.5 mm or less.

In a preferable aspect thereof, the PSA sheet further has the property in which the distance the PSA sheet lifts from an ABS sheet in a foam repulsion resistance test measured according to the method described in the subsequently described examples is 5 mm or less (property G). The lifting distance is more preferably 3 mm or less and even more preferably 2 mm or less. Particularly preferably, the lifting distance is essentially zero.

In the art disclosed herein, the aqueous dispersion type PSA composition used to form the PSA layer contains an aqueous dispersion type acrylic polymer. This aqueous dispersion type acrylic polymer is a composition in the form of an emulsion in which an acrylic polymer is dispersed in water. The acrylic polymer is used as a base polymer of a PSA that composes the PSA layer (PSA base component, and typically a component that accounts for 50% by weight or more of the polymer component that composes the PSA). For example, 50% by weight or more of the PSA is preferably the acrylic polymer. An acrylic polymer having alkyl(meth)acrylate as the main composite monomer component thereof (main monomer component, namely a component that accounts for 50% by weight or more of the total amount of monomer that composes the acrylic polymer) can be preferably used for the acrylic polymer.

Furthermore, the term "(meth)acrylate" in the present description comprehensively refers to acrylate and methacrylate. Similarly, "(meth)acryloyl" comprehensively refers to acryloyl and methacryloyl, while "(meth)acryl" comprehensively refers to acryl and methacryl.

A compound represented by the following formula (1) can be preferably used for the alkyl(meth)acrylate.

$$CH_2=C(R^1)COOR^2 \qquad (1)$$

Here, $R^1$ in formula (1) above represents a hydrogen atom or methyl group. In addition, $R^2$ represents an alkyl group having 1 to 20 carbon atoms. Specific examples of $R^2$ include alkyl groups such as a methyl group, ethyl group, propyl group, isopropyl group, n-butyl group, isobutyl group, s-butyl group, t-butyl group, pentyl group, isoamyl group, neopentyl group, hexyl group, heptyl group, octyl group, isooctyl group, 2-ethylhexyl group, nonyl group, isononyl group, decyl group, isodecyl group, undecyl group, dodecyl group, tridecyl group, tetradecyl group, pentadecyl group, hexadecyl group, heptadecyl group, octadecyl group, nonadecyl group or eicosyl group. From the viewpoint of storage elastic modulus of the PSA, an alkyl(meth)acrylate in which $R^2$ is an alkyl group having 2 to 14 carbon atoms (the range of carbon atoms in this manner may be hereinafter represented as "$C_{2-14}$") is preferable. An alkyl(meth)acrylate group in which $R^2$ is a $C_{2-10}$ alkyl group is more preferable. Particularly preferable examples of $R^2$ include a n-butyl group and 2-ethylhexyl group.

In a preferable embodiment, approximately 50% by weight or more of the total amount of alkyl(meth)acrylate used to synthesize the acrylic polymer (more preferably 70% by weight or more, and for example, approximately 80% by weight or more) is alkyl(meth)acrylate in which $R^2$ in formula (1) above is a $C_{2-14}$ (preferably $C_{2-10}$ and more preferably $C_{4-8}$) alkyl group. According to such a monomer composition, an acrylic polymer is easily obtained in which the storage elastic modulus thereof in the vicinity of room temperature is within a preferable range for use as a PSA. Essentially all of the alkyl(meth)acrylate used may be a $C_{2-14}$ alkyl(meth)acrylate.

The alkyl(meth)acrylate that composes the acrylic polymer in the art disclosed here may be n-butyl acrylate (BA) alone, may be 2-ethylhexyl acrylate (2EHA) alone, or may be two types consisting of BA and 2EHA. In the case of combining the use of BA and 2EHA for the alkyl(meth)acrylate, there are no particular limitations on the ratios at which they are used. For example, a ratio can be preferably used in which roughly 40% by weight or more (for example, approximately 45 to 95% by weight) of the total amount of BA and 2EHA is 2EHA.

Another monomer capable of copolymerizing with alkyl (meth)acrylate may be used as a monomer component that composes the acrylic polymer within a range such that the alkyl (meth)acrylate is the main component (and which also may be referred to as a "copolymerizable monomer component"). The proportion of alkyl(meth)acrylate to the total amount of monomer component that composes the acrylic polymer can be approximately 80% by weight or more (and typically 80 to 99.8% by weight), and preferably 85% by weight or more (for example, 85 to 99.5% by weight). The proportion of the alkyl(meth)acrylate may be 90% by weight or more (90 to 99% by weight).

The above-mentioned copolymerizable monomer component is useful for introducing crosslinking sites into the acrylic polymer or enhancing the cohesive strength of the acrylic polymer. The copolymerizable monomer can be used alone or two or more types thereof can be used in combination.

More specifically, monomer components containing various types of functional groups (and typically monomer components containing thermal crosslinking functional groups for introducing crosslinking sites that are crosslinked by heat into the acrylic polymer) can be used for the copolymerizable monomer component for introducing crosslinking sites into the acrylic polymer. The use of such functional group-containing monomer components is able to improve adhesive strength to an adherend. There are no particular limitations on this type of functional group-containing monomer component provided it is a monomer component that is able to copolymerize with the alkyl(meth)acrylate and provide functional groups serving as crosslinking sites. For example, the following types of functional group-containing monomer components can be used alone or in a combination of two or more types thereof:

carboxyl group-containing monomers, for examples, ethylenic unsaturated monocarboxylic acids such as acrylic acid, methacrylic acid or crotonic acid, and ethylenic unsaturated dicarboxylic acids such as maleic acid, itaconic acid or citraconic acid and anhydrides thereof (such as maleic anhydride or itaconic anhydride);

hydroxyl group-containing monomers, for examples, hydroxyalkyl(meth)acrylates such as 2-hydroxyethyl(meth) acrylate, 2-hydroxypropyl(meth)acrylate, 3-hydroxypropyl (meth)acrylate or 2-hydroxybutyl(meth)acrylate, and unsaturated alcohols such as vinyl alcohol or allyl alcohol;

amide group-containing monomers, for examples, (meth) acrylamide, N,N-dimethyl(meth)acrylamide, N-butyl(meth) acrylamide, N-methylol(meth)acrylamide, N-methylolpropane(meth)acrylamide, N-methoxymethyl(meth)acrylamide or N-butoxymethyl(meth)acrylamide;

amino group-containing monomers, for examples, aminoethyl(meth)acrylate, N,N-dimethylaminoethyl(meth)acrylate or t-butylaminoethyl(meth)acrylate;

epoxy group-containing monomers, for examples, glycidyl(meth)acrylate, methylglycidyl(meth)acrylate or allylglycidyl ether;

cyano group-containing monomers, for examples, acrylonitrile or methacrylonitrile;

keto group-containing monomers: diacetone(meth)acrylamide, diacetone(meth)acrylate, vinyl methyl ketone, vinyl ethyl ketone, allylacetoacetate or vinylacetoacetate;

nitrogen atom-containing monomers, for examples, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylprolactam or N-(meth)acryloylmorpholine; and alkoxysilyl group-containing monomers, for examples, 3-(meth)acryloxypropyl trimethoxysilane, 3-(meth)acryloxypropyl triethoxysilane, 3-acryloxypropyl triethoxysilane, 3-(meth)acryloxypropyl methyl dimethoxysilane or 3-(meth) acryloxypropyl methyl diethoxysilane.

One or more types of these functional group-containing monomer components selected from carboxyl group-containing monomers or acid anhydrides thereof can be used preferably. Essentially all of the functional group-containing monomer components may be carboxyl group-containing monomers. Particularly preferable examples of carboxyl group-containing monomers include acrylic acid and methacrylic acid. One of these may be used alone or acrylic acid and methacrylic acid may be used in combination in an arbitrary ratio.

The above-mentioned functional group-containing monomer component is preferably used within the range of, for example, approximately 12 parts by weight or less (for example, approximately 0.5 to 12 parts by weight, and preferably within the range of approximately 1 to 8 parts by weight) relative to 100 parts by weight of alkyl(meth)acrylate. If the amount of functional group-containing monomer component is excessively high, cohesive strength becomes excessively high and adhesive properties (such as adhesive strength) tend to decrease.

In addition, another copolymerizing component can be used other than the above-mentioned functional group-containing monomers in order to enhance cohesive strength of the acrylic polymer. Examples of such copolymerizing components include vinyl ester-based monomers such as vinyl acetate or vinyl propionate; aromatic vinyl compounds such as styrene, substituted styrene (such as α-methylstyrene) or vinyl toluene; non-aromatic ring-containing (meth)acrylates such as cycloalkyl(meth)acrylates (such as cyclohexyl(meth) acrylate or cyclopentyl di(meth)acrylate) or isobornyl(meth) acrylate; aromatic ring-containing (meth)acrylates such as aryl(meth)acrylates (such as phenyl(meth)acrylate), aryloxyalkyl(meth)acrylates (such as phenoxyethyl(meth)acrylate) or arylalkyl(meth)acrylates (such as benzyl(meth)acrylate); olefin-based monomers such as ethylene, propylene, isoprene, butadiene or isobutylene; chlorine-containing monomers such as vinyl chloride or vinylidene chloride; isocyanate group-containing monomers such as 2-(meth)acryloyloxyethyl isocyanate; alkoxy group-containing monomers such as methoxyethyl(meth)acrylate or ethoxyethyl(meth)acrylate; and, vinyl ether-based monomers such as methyl vinyl ether or ethyl vinyl ether.

Other examples of copolymerizable monomer components include monomers having a plurality of functional groups in a molecule thereof. Examples of such multifunctional monomers include 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, (poly)ethylene glycol di(meth)acrylate, propylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, glycerin di(meth)acrylate, epoxy acrylate, polyester acrylate, urethane acrylate, divinylbenzene, butyl di(meth)acrylate and hexyl di(meth)acrylate.

A known and commonly used polymerization method can be employed to obtain the aqueous dispersion type acrylic polymer by polymerizing such monomers, and emulsion polymerization can be used preferably. Examples of methods that can be suitably used to supply monomers during emulsion polymerization include a bulk loading method in which all monomer components are supplied at once, a continuous supply (dropwise addition) method, and an intermittent (dropwise addition) method. All or a portion of the monomers (and typically all of the monomers) may also be preliminarily mixed with water (and a suitable amount of emulsifier is typically used with the water) and emulsified followed by supplying the emulsion (monomer emulsion) either in bulk, continuously or intermittently to a reaction vessel. The polymerization temperature can be suitably selected according to the type of monomer used, type of polymerization initiator used and the like. For example, the polymerization temperature can be about 20 to 100° C. (and typically 40 to 80° C.).

The polymerization initiator used during polymerization can be suitably selected from known and commonly used polymerization initiators corresponding to the type of polymerization method. For example, in the case of emulsion polymerization, azo-based polymerization initiators can be used preferably. Typical examples of azo-based polymerization initiators include 2,2'-azobisisobutyronitrile, 2,2'-azobis(2-methylpropionamidine)disulfate, 2,2'-azobis(2-amidinopropane)dihydrochloride, 2,2'-azobis[2-(5-methyl-2-imidazolin-2-yl)propane]dihydrochloride, 2,2'-azobis(N,N'-dimethyleneisobutyrylamidine), 2,2'-azobis[N-(2-carboxyethyl)-2-methylpropionamidine]hydrate, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane) and dimethyl-2,2'-azobis(2-methylpropionate).

Other examples of polymerization initiators include persulfates such as potassium persulfate or ammonium persulfate, peroxide-based initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy)cyclododecane or hydrogen peroxide, substituted ethane-based initiators such as phenyl-substituted ethane, and aromatic carbonyl compounds. Additional examples of polymerization initiators include redox-based initiators obtained by combining a peroxide and reducing agent. Examples of redox-based initiators include combinations of hydroxides and ascorbic acid (such as a combination of aqueous hydrogen peroxide and ascorbic acid), combinations of peroxide and ferrous salts (such as a combination of aqueous hydrogen peroxide and ferrous salt), and combinations of persulfates and sodium bisulfite.

These polymerization initiators can be used alone or in a combination of two or more types thereof. The amount of polymerization initiator used may be an ordinarily used amount, and can be selected, for example, from a range of about 0.005 to 1 part by weight (and typically 0.01 to 1 part by weight) based on 100 parts by weight of all monomer components.

In the emulsion polymerization of the monomer components as described above, a chain transfer agent is used to adjust the molecular weight of the acrylic polymer formed by the polymerization. This is because, in the production of an acrylic polymer by aqueous emulsion polymerization, the molecular weight of the copolymer becomes excessively high in comparison with the case of solution polymerization. The following provides a more detailed explanation of this. Namely, in the production of an acrylic polymer by solution polymerization, since solvent molecules are present during the polymerization reaction of monomers, the likelihood of collision between monomer radicals is low in comparison with a polymerization reaction in the absence of solvent in the manner of bulk polymerization. In contrast, aqueous emulsion polymerization is typically carried out under conditions in which a surfactant is present in the polymerization reaction system at a concentration that exceeds the critical micelle concentration, and micelle structures are formed in which the surfactant is oriented with the hydrophobic functional group moiety thereof facing to the inside in roughly the shape of a sphere. In such a polymerization mode, monomers are surrounded by the insides of the micelle structures or by surfactant that has not formed micelle structures, and formation of monomer radicals occurs due to collisions between the micelles and the initiator. Collisions between formed monomer radicals occur inside the micelles. Thus, the likelihood of collisions between monomer radicals during aqueous emulsion polymerization is higher than that in the case of solution polymerization as described above, and the molecular weight of the copolymer therefore tends to be higher. If the molecular weight of the acrylic polymer used for the base polymer of the PSA is excessively high, it becomes difficult for the PSA to simultaneously realize various adhesive properties at a high level. For example, there is increased likelihood of the occurrence of problems such as a decrease in curved surface adhesion due to a disturbance in the balance between adhesive strength (and particularly adhesive strength with respect to lowly polar materials in the manner of polyolefin resins) and cohesive strength (and particularly heat-resistant cohesive strength). Thus, in order to obtain a PSA composition capable of forming a high-performance PSA sheet, it is important to adjust the molecular weight of the acrylic polymer that is a constituent of the composition by using a chain transfer agent during emulsion polymerization of the acrylic polymer.

In the art disclosed here, a compound that does not contain sulfur as a composite element thereof is used for the chain transfer agent used in the above-mentioned emulsion polymerization (sulfur-free chain transfer agent). Such a sulfur-free chain transfer agent does not become a generation source of the previously described sulfur-containing metal-corroding gas. Thus, corrosion of metal attributable to the chain transfer agent can be prevented or reduced by using a sulfur-free chain transfer agent for at least a portion of the chain transfer agent used in the emulsion polymerization. In a preferable embodiment of the art disclosed here, the proportion of sulfur-free chain transfer agent in the chain transfer agent used to synthesize the acrylic polymer is approximately 60% by weight or more, more preferably approximately 75% by weight or more and even more preferably approximately 90% by weight or more. In a preferable embodiment thereof, essentially all of the chain transfer agents used to synthesize the acrylic polymer is sulfur-free. In other words, only sulfur-free chain transfer agents are used for the chain transfer agent.

Various types of compounds capable of demonstrating chain transferring ability in emulsion polymerization of a monomer component that do not contain sulfur as a composite element thereof can be used as sulfur-free chain transfer agents. Specific examples of such sulfur-free chain transfer agents include anilines (such as N,N-dimethylaniline or N,N-diethylaniline), styrenes (such as α-methylstyrene or α-methylstyrene dimer), compounds having a benzylidene group (such as dibenzylidene acetone, cinnamyl alcohol or cinnamyl aldehyde), hydroquinones (such as hydroquinone and naphthohydroquinone), quinones (such as benzoquinone or naphthoquinone), conjugated or non-conjugated olefins (such as 2,3-dimethyl-2-butene, 1,5-cyclooctadiene or sorbic acid), alcohols having a phenyl group (such as phenol, benzyl alcohol or allyl alcohol), and phenyl-substituted benzenes (such as diphenylbenzene or triphenylbenzene). Examples of sulfur-free chain transfer agents able to be used preferably in the art disclosed here include N,N-dialkylanilines (such as N,N-diethylaniline), compounds having a benzylidene group (such as cinnamyl aldehyde), non-conjugated cycloalkyldienes (such as 1,5-cyclooctadiene) and 2,3-dimethyl-2-butene.

Furthermore, a conventional ordinary sulfur-containing chain transfer agent can be used with the sulfur-free chain transfer agent during synthesis of the aqueous dispersion type acrylic polymer (typically emulsion polymerization) provided the preferable released amount of sulfur-containing gas disclosed herein can be realized. Examples of such ordinary sulfur-containing chain transfer agents include mercaptans (also referred to as a primary mercaptan hereinafter) of a structure having at least one mercapto group bonded to a primary carbon atom, such as n-lauryl mercaptan, 2-mercaptoethanol, mercaptoacetate, 2-ethylhexyl thioglycolate or 2,3-dimercapto-1-propanol. However, in the case of only using a primary mercaptan for the chain transfer agent, it is difficult to decrease the released amount of sulfur-containing gas to the preferable range disclosed herein while also realizing desired adhesion performance. In addition, it is particularly preferable to not use a primary mercaptan for the chain transfer agent from the viewpoint of realizing a higher level of metal corrosion preventability.

In order to demonstrate desired adhesion performance, the total amount of chain transfer agent used during synthesis of the acrylic polymer is preferably approximately 0.001 part by weight or more (and typically approximately 0.001 to 5 parts by weight) based on 100 parts by weight of the monomer component. Normally, preferable effects may be realized by using the chain transfer agent at approximately 0.005 to 2 parts by weight (and typically approximately 0.01 to 1 part by weight) based on 100 parts by weight of the monomer component. For example, the chain transfer agent can be preferably used within the above-mentioned range during synthesis of an acrylic polymer for a double-sided PSA sheet. If the amount of chain transfer agent is excessively high, there can be cases in which polymerization rate tends to decrease.

Thus, a polymer mixture in the form of an emulsion in which an acrylic polymer is dispersed in water (acrylic polymer emulsion) is obtained by emulsion polymerization using a sulfur-free chain transfer agent. The above-mentioned polymer mixture or that which has undergone suitable post-treatment can be preferably used for the aqueous dispersion type acrylic polymer used in the art disclosed herein. Alternatively, an acrylic polymer may be synthesized by a polymerization method other than emulsion polymerization (such as solution polymerization, photopolymerization or bulk polymerization) using any of the sulfur-free chain transfer agents disclosed herein, and an aqueous dispersion type acrylic polymer may be used that has been prepared by dispersing the polymer in water.

An emulsifier can be used as necessary when preparing the aqueous dispersion acrylic polymer. Examples of emulsifiers that can be used include anionic, nonionic and cationic emulsifiers. Normally an anionic or nonionic emulsifier is used preferably. Such emulsifiers can be used preferably during, for example, emulsion polymerization of monomer components or when dispersing acrylic polymers obtained by other methods in water.

Examples of anionic emulsifiers include alkyl sulfate-type anionic emulsifiers such as sodium lauryl sulfate, ammonium lauryl sulfate or potassium lauryl sulfate, polyoxyethylene alkyl ether sulfate-type anionic emulsifiers such as sodium polyoxyethylene lauryl ether sulfate, polyoxyethylene alkyl phenyl ether sulfate-type anionic emulsifiers such as ammonium polyoxyethylene lauryl phenyl ether sulfate or sodium polyoxyethylene lauryl phenyl ether sulfate, sulfonate-type anionic emulsifiers such as sodium dodecylbenzenesulfonate, and sulfosuccinic acid-type anionic emulsifiers such as disodium lauryl sulfosuccinate or disodium polyoxyethylene lauryl sulfosuccinate.

In addition, examples of nonionic emulsifiers include polyoxyethylene alkyl ether-type nonionic emulsifiers such as polyoxyethylene lauryl ether, polyoxyethylene alkyl phenyl ether-type nonionic emulsifiers such as polyoxyethylene lauryl phenyl ether, polyoxyethylene fatty acid esters, and polyoxyethylene-polyoxypropylene block copolymers. A radical polymerizable emulsifier (reactive emulsifier) having a structure in which a radical polymerizable group (such as a propenyl group) is introduced into an anionic or nonionic emulsifier as described above may also be used.

One type of these emulsifiers may be used alone or two or more types may be used in combination. There are no particular limitations on the amount of emulsifier used provided it is an amount that allows the acrylic polymer to be prepared in the form of an emulsion. For example, the amount of emulsifier used is suitably selected from a range of approximately 0.2 to 10 parts by weight (and preferably approximately 0.5 to 5 parts by weight) based on the solid content thereof per 100 parts by weight of the acrylic polymer. If the amount of emulsifier used is too low, there are cases in which it is difficult to obtain desired dispersion stability (such as polymerization stability or mechanical stability). If the amount of emulsifier used is too high, adhesion performance tends to decrease.

In a preferable embodiment of the art disclosed herein, a gel fraction Ga of the acrylic polymer that composes the aqueous dispersion type acrylic polymer (weight ratio of ethyl acetate insoluble portion) is within the range of approximately 35 to 65% by weight. Ga is more preferably within the range of approximately 40 to 60% by weight and even more preferably within the range of approximately 40 to 55% by weight. An PSA sheet of higher performance can be formed by using a PSA composition containing such an acrylic polymer.

Here, the gel fraction Ga of the acrylic polymer as described above refers to the weight ratio of an insoluble portion remaining after extracting a non-volatile portion with ethyl acetate after having dried the aqueous dispersion type acrylic polymer. The gel fraction Ga can be measured according to the method indicated below.

[Measurement of Gel Fraction of Acrylic Polymer]

About 0.1 g of acrylic polymer as a measurement sample (weight: $W_{a1}$ mg) is wrapped in the form of a pouch with a porous film made of tetrafluoroethylene resin having an average pore diameter of 0.2 μm (weight: $W_{a2}$ mg), and the opening is tied with twine (weight: $W_{a3}$ mg). This package is placed in a screw-top tube having a volume of 50 mL (one screw-top tube is used for each package), and the screw-top tube is filled with ethyl acetate. After allowing the filled screw-top tube to stand for 7 days at room temperature (typically 23° C.), the package is removed and dried for 2 hours at 130° C. followed by measurement of the package weight ($W_{a4}$ mg). The gel fraction Ga of the acrylic polymer is determined by substituting each of the values into the following equation:

$$Ga[\%]=[(W_{a4}-W_{a2}-W_{a3})/W_{a1}]\times 100$$

In a preferable aspect of the art disclosed herein, a swelling degree S of the acrylic polymer that composes the aqueous dispersion type acrylic polymer is within the range of approximately 15 to 55% by weight, more preferably within the range of approximately 20 to 50% by weight, and even more preferably within the range of approximately 25 to 45% by weight. A PSA sheet having higher performance can be formed by using a PSA composition containing such an acrylic polymer.

[Measurement of Swelling Degree of Acrylic Polymer]

About 0.1 g of acrylic polymer as a measurement sample (weight: $W_{S1}$ mg) is wrapped in the form of a pouch with a porous film made of tetrafluoroethylene resin having an average pore diameter of 0.2 μm (weight: $W_{S2}$ mg), and the opening is tied with twine (weight: $W_{S3}$ mg). This package is placed in a screw-top tube having a volume of 50 mL (one screw-top tube is used for each package), and the screw-top tube is filled with ethyl acetate. After allowing the filled screw-top tube to stand for 7 days at room temperature (typically 23° C.), the package is removed and ethyl acetate adhered to the outside of the package is gently wiped off followed by measuring the weight of the package ($W_{S4}$ mg). The swelling degree S of the acrylic polymer is determined by substituting each of the values into the following equation:

$$S[\%]=[(W_{S4}-W_{S2}-W_{S3})/W_{S1}]\times 100$$

"Nitoflon® NTF1122" manufactured by Nitto Denko Corporation, or a product equivalent thereto, is preferably used as the tetrafluoroethylene resin porous film used to measure Ga and S as described above. In addition, an aqueous dispersion type acrylic polymer (acrylic polymer emulsion) dried for 2 hours at 130° C., for example, may also be used for the measurement sample during measurement of these values.

The gel fraction Ga and swelling degree S of the acrylic polymer can be arbitrarily adjusted by suitably setting the amount of chain transfer agent used to synthesize the acrylic polymer (typically by emulsion polymerization). In a preferable embodiment of the art disclosed herein, the amount of chain transfer agent used to synthesize the acrylic polymer is set so that an acrylic polymer is obtained in which at least one of Ga and S (and preferably both) is within the above-mentioned range. In the case of changing the chain transfer agent used to synthesize the acrylic polymer from a sulfur-containing chain transfer agent (typically, a primary mercaptan such as n-lauryl mercaptan) to a sulfur-free chain transfer agent, the amount of the sulfur-free chain transfer agent used can be set so that the Ga value of the resulting acrylic polymer is roughly the same (for example, the difference in Ga values is preferably within ±5% and more preferably within ±3%). In addition, in this case the amount of sulfur-free chain transfer agent used can also be set so that the S value of the resulting acrylic polymer is roughly the same (for example, the difference in S values is preferably within ±10% and more preferably within ±5%). By setting the amount of the sulfur-free chain transfer agent used so that at least one of the values of Ga and S (and preferably both) are roughly the same, an acrylic copolymer can be synthesized that is capable of composing a PSA sheet for which the amount of sulfur-containing gas released is reduced considerably while maintaining adhesion performance comparable to that of the case of using a sulfur-containing chain transfer agent.

The PSA composition in the art disclosed herein may further comprise a tackifier resin in addition to the aqueous dispersion type acrylic polymer. There are no particular limitations on the tackifier resin, and various types of tackifier resins can be used, such as rosin-based, terpene-based, hydrocarbon-based, epoxy-based, polyamide-based, elastomer-based, phenol-based or ketone-based resin. This type of tackifier resin can be used alone or two or more types can be used in combination.

More specifically, examples of rosin-based tackifier resins include unmodified rosin such as gum rosin, wood rosin or tall oil rosin (raw rosin), modified rosins in which these unmodified rosins are modified by hydrogenation, disproportionation or polymerization (such as hydrogenated rosin, disproportionated rosin, polymerized rosin or other chemically modified rosins), and various other rosin derivatives. Examples of the rosin derivatives include rosin esters such as those in which unmodified rosins have been esterified with alcohol (namely, rosin esterification products), or those in which modified rosins (such as hydrogenated rosins, disproportionated rosins or polymer rosins) have been esterified by alcohol (namely, modified resin esterification products); unsaturated fatty acid-modified rosins in which unmodified rosins or modified rosins (such as hydrogenated rosins, disproportionated rosins or polymer rosins) have been modified by unsaturated fatty acid; unsaturated fatty acid-modified rosin esters in which rosin esters have been modified with unsaturated fatty acid; rosin alcohols in which carboxyl groups present in unmodified rosins, modified rosins (such as hydrogenated rosins, disproportionated rosins or polymer rosins), unsaturated fatty acid-modified rosins or unsaturated fatty acid-modified rosin esters are subjected to reduction treatment; metal salts of rosins such as unmodified rosins, modified rosins or various types of rosin derivatives (and particularly rosin esters); and, rosin phenol resins obtained by adding phenol to rosins (unmodified rosins, modified rosins or various types of rosin derivatives) followed by thermal polymerization.

Examples of terpene-based tackifier resins include terpene-based resins such as α-pinene polymer, β-pinene polymer or dipentene polymer, and modified terpene-based resins obtained by modifying these terpene-based resins (such as by phenol modification, aromatic modification, hydrogenation modification or hydrocarbon modification). Examples of the above-mentioned modified terpene-based resins include terpene-phenol-based resins, styrene-modified terpene-based resins, aromatic-modified terpene-based resins and hydrogenated terpene-based resins.

Examples of hydrocarbon-based tackifier resins include various types of hydrocarbon-based resins such as aliphatic hydrocarbon resins, aromatic hydrocarbon resins, aliphatic cyclic hydrocarbon resins, aromatic-aliphatic petroleum resins (such as styrene-olefin-based copolymers), aliphatic-alicyclic petroleum resins, hydrogenated hydrocarbon resins, coumarone-based resins or coumarone-indene-based resins. Examples of aliphatic hydrocarbon resins include polymers of one type or two or more types of aliphatic hydrocarbons selected from olefins and dienes having 4 to 5 carbon atoms. Examples of the above-mentioned olefins include 1-butene, isobutylene and 1-pentene. Examples of the above-mentioned dienes include butadiene, 1,3-pentadiene and isoprene. Examples of aromatic hydrocarbon resins include polymers of vinyl group-containing aromatic hydrocarbons (such as styrene, vinyltoluene, α-methylsytrene, indene or methylindene) having 8 to 10 carbon atoms. Examples of aliphatic cyclic hydrocarbon resins include alicyclic hydrocarbon resins obtained by cyclic dimerization of so-called "C4 petroleum fractions" and "C5 petroleum fractions" followed by polymerization, polymers or hydrogenation products of cyclic diene compounds (such as cyclopentadiene, dicyclopentadiene, ethylidene norbornene or dipentene), and alicyclic hydrocarbon resins obtained by hydrogenation of an aromatic ring of an aromatic hydrocarbon resin or aliphatic-aromatic petroleum resin.

In the art disclosed herein, a tackifier resin in which the softening point (softening temperature) is approximately 80° C. or higher (and preferably approximately 100° C. or higher) can be used preferably. According to such a tackifier resin, a PSA sheet exhibiting higher performance (such as high adhesiveness) can be realized. There are no particular limitations on the upper limit of the softening point of the tackifier resin, and can be made to be, for example, approximately 170° C. or lower (and typically approximately 160° C. or lower). In an tackifier resin in which the softening point is higher than 170° C., there may be a tendency for compatibility with the acrylic polymer to decrease.

Furthermore, the softening point of the tackifier resin as referred to here is defined as the value measured on the basis of the softening point test method (ring and ball method) stipulated in JIS K 5902 and JIS K 2207. More specifically, after promptly melting a sample at as low a temperature as possible, it is carefully filled into a ring placed on a flat metal plate so that bubbles are not formed. When cooled, the portion that has risen above the plane, including the upper edge of the ring, is cut off with a slightly heated small knife. Next, a support (ring stand) is placed in a glass container (heating vessel) having a diameter of 85 mm or more and height of 127 mm or more, and glycerin is poured in to a depth of 90 mm or more. Next, a steel ring (diameter: 9.5 mm, weight: 3.5 g) and the ring filled with the sample are immersed in the glycerin so as to make mutual contact, and the temperature of the glycerin is at 20±5° C. for 15 minutes. Next, the steel ring is placed in the center of the surface of the sample in the ring, and this is placed at a prescribed location on the support. Next, a thermometer is placed inside while maintaining a distance of 50 mm from the upper edge of the ring to the surface of the glycerin, the location of the center of the mercury bulb of the thermometer is made to be at the same height as the center of the bottom ring, and the container is heated. The flame of the Bunsen burner used for heating is made to contact the bottom of the container at a location intermediate to the center and edge of the bottom of the container to ensure uniform heating. Furthermore, the rate of the temperature rise of the solution after having reached 40° C. from the start of heating must be 5.0±0.5° C. per minute. The temperature is read when the sample gradually softens, flows down from the ring and contacts the bottom plate, and the temperature at that time is taken to be the softening point. Measurement of softening point is carried out on at least two samples simultaneously and the average value thereof is used as the softening point of the sample.

This type of tackifier resin can be preferably used in the form of an emulsion in which the resin is dispersed in water. The above-mentioned tackifier resin emulsion can be prepared using an emulsifier as necessary. One type or two or more types of the same emulsifiers as those that can be used to prepare the aqueous dispersion type acrylic polymer can be suitably selected and used for the emulsifier. Normally, an anionic emulsifier or nonionic emulsifier is used preferably. Furthermore, the emulsifier used to prepare the aqueous dispersion type acrylic polymer and the emulsifier used to prepare the tackifier resin may be the same or different. For example, a mode in which an anionic emulsifier is used to prepare both emulsions, a mode in which a nonionic emulsifier is used to prepare both emulsions, or a mode in which an anionic emulsion is used to prepare one of the emulsions while a nonionic emulsion is used to prepare the other emulsion can be preferably employed. There are no particular limitations on the amount of emulsifier used provided it is an amount that enables the tackifier resin to be prepared in the form of an emulsion, and for example, can be selected from a range of 0.2 to 10 parts by weight (and preferably 0.5 to 5 parts by weight) based on 100 parts by weight (as a solid fraction) of the tackifier resin.

There are no particular limitations on the amount of the tackifier resin used, and can be suitably set corresponding to the target adhesion performance (such as adhesive strength). For example, in terms of the solid fraction thereof, the tackifier resin can be preferably used at a ratio of approximately 10 to 100 parts by weight (more preferably 15 to 80 parts by weight and even more preferably 20 to 60 parts by weight) relative to 100 parts by weight of the acrylic polymer.

A crosslinking agent may also be used in the above-mentioned aqueous dispersion type acrylic polymer as necessary. There are no particular limitations on the type of crosslinking agent, and can be suitably selected and used from among known and commonly used crosslinking agents (such as isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents or amine-based crosslinking agents). An oil-soluble or water-soluble crosslinking agent can be used here. The crosslinking agent can be used alone or two or more types can be used in combination. There are no particular limitations on the amount of crosslinking agent used, and for example, can be selected from a range of approximately 10 parts by weight or less (such as approximately 0.005 to 10 parts by weight and preferably approximately 0.01 to 5 parts by weight) relative to 100 parts by weight of the acrylic polymer.

The above-mentioned PSA composition can also contain an acid or base (such as aqueous ammonia) used for the purpose of adjusting pH and the like as necessary. Examples of other arbitrary components able to be contained in the composition include various types of additives commonly used in the field of aqueous PSA compositions, such as viscosity adjusters (such as thickeners), leveling agents, release adjusters, plasticizers, softeners, fillers, colorants (such as pigments or dyes), surfactants, antistatic agents, preservatives, anti-aging agents, ultraviolet absorbers, antioxidants or photostabilizers.

The PSA layer in the art disclosed herein can be preferably formed by applying an aqueous dispersion type PSA composition as described above to a prescribed surface followed by drying or curing. A commonly used coater (such as a gravure roll coater, reverse roll coater, kiss-roll coater, dip roll coater, bar coater, knife coater or spray coater) can be used when applying (typically, by coating) the PSA composition. There are no particular limitations on the thickness of the PSA layer, and can be, for example, approximately 2 μm to 200 μm (and preferably approximately 5 μm to 100 μm).

An PSA sheet provided with this PSA layer can be produced by various methods. For example, in the case of a PSA sheet with a substrate, a method can be used in which a PSA layer is formed on the substrate by directly applying the PSA composition to the substrate and then drying or curing followed by laminating a release liner on the PSA layer, or a method in which a PSA layer formed on a release liner is laminated on a substrate and the PSA layer is transferred to the substrate together with using the release liner to protect the PSA layer.

In the PSA sheet disclosed herein, examples of substrates used to support (back) the PSA layer include films made of polyolefins (such as polyethylene, polypropylene or ethylene-propylene copolymer), films made of polyesters (such as polyethylene terephthalate), plastic films such as vinyl chloride-based resin films, vinyl acetate-based resin films, polyimide-based resin films, polyamide-based resin films, fluorine-based resin films or other cellophanes, paper such as Washi paper, kraft paper, glassine paper, fine paper, synthetic paper or top coated paper, woven or non-woven fabrics consisting of one type or a blend of various types of fibrous substances (which may be natural fibers, semi-synthetic fibers or synthetic fibers, such as linear fibers, staple fibers, manila hemp, pulp, rayon, acetate fibers, polyester fibers, polyvinyl alcohol fibers, polyamide fibers or polyolefin fibers), rubber sheets composed of natural rubber or butyl rubber, foam sheets composed of foams such as polyurethane foam or polychloroprene rubber foam, aluminum foil, copper foil and other metal foils, and composites thereof. The above-mentioned plastic films may be of the non-oriented type or oriented type (uniaxially oriented type of biaxially oriented type). The substrate may have the form of a single layer or have a laminated form.

Various types of additives may be incorporated in the above-mentioned substrate as necessary, examples of which include fillers (such as inorganic fillers or organic fillers), anti-aging agents, antioxidants, ultraviolet absorbers, antistatic agents, lubricants, plasticizers and colorants (such as pigments or dyes). The surface of the substrate (and particularly the surface on the side on which the PSA layer is provided) may be subjected to a known or commonly used surface treatment such as corona discharge treatment, plasma treatment or coating of an undercoating agent. Such surface treatment can be treatment for, for example, enhancing anchoring of the PSA layer by the substrate. Although the thickness of the substrate can be suitably selected corresponding to the purpose, in general it is approximately 10 μm to 500 μm (preferably approximately 10 μm to 200 μm).

There are no particular limitations on the material or composition of the release liner (which can have both protective and supportive functions) that protects or supports the PSA layer, and a suitable release liner can be selected for use among known release liners. For example, a release liner having a composition in which at least one side of the substrate is subjected to release treatment (and typically a release treatment layer is provided by a release treatment agent) can be used preferably. The same substrates as those listed as examples of substrates that compose the PSA sheet (such as various types of plastic films, paper, fabrics, rubber sheets, foam sheets, metal foils or composites thereof) can be used for the substrate (release treatment material) that composes this type of release liner. A known or commonly used release treatment agent (such as a silicone-based, fluorine-based or long-chain alkyl-based release treatment agent) can be used for the release treatment agent that forms the above-mentioned release treatment layer. In addition, a lowly adhesive substrate composed of a fluorine-based polymer (such as polytetrafluoroethylene, polychlorotrifluoroethylene, polyvinyl fluoride, polyvinylidene fluoride, tetrafluoroethylene-hexafluoropropylene copolymer or chlorofluoroethylene-vinylidene fluoride copolymer) or lowly polar polymer (such as polyethylene, polypropylene or other olefin-based resins) may also be used as a release liner without subjecting the surface of the substrate to release treatment. Alternatively, a release liner in which release treatment has been carried out on the surface of such a lowly adhesive substrate may also be used as a release liner.

There are no particular limitations on the substrate that composes the release liner or on the thickness of the release treatment layer, and can be suitably selected corresponding to the purpose and the like. The total thickness of the release liner (total thickness including the substrate and the release treatment layer in a release liner of a composition having a release treatment layer on the substrate) is, for example, preferably approximately 15 μm or more (and typically approximately 15 μm to 500 μm), and more preferably approximately 25 μm to 500 μm.

In addition, in the case of carrying out crosslinking when forming the PSA layer, crosslinking can be carried out by a known and commonly used crosslinking method in a prescribed production process corresponding to the type of crosslinking agent (such as a thermal crosslinking type of crosslinking agent that carries out crosslinking using heat or a photocrosslinking type of crosslinking agent that carries out crosslinking when irradiated with ultraviolet light). For example, in the case the crosslinking agent used is of the thermal crosslinking type, crosslinking can be carried out by allowing the crosslinking reaction to proceed either in parallel with or simultaneous to drying during drying following coating of an aqueous dispersion type acrylic PSA. More specifically, crosslinking can be carried out together with drying by heating to a temperature equal to or higher than the temperature at which the crosslinking reaction proceeds corresponding to the type of thermal crosslinking type crosslinking agent.

In the art disclosed herein, although there are no particular limitations on the proportion of solvent-insoluble fraction (crosslinked acrylic polymer) in the PSA that composes the PSA layer, it is preferably approximately 15 to 70% by weight. The proportion of solvent-insoluble fraction refers to the ratio of the weight of the insoluble fraction remaining after extracting the PSA with ethyl acetate. In addition, in this case, the weight average molecular weight of the solvent-insoluble fraction of the PSA (acrylic polymer obtained after extracting the PSA with tetrahydrofuran) is preferably within the range of approximately 100,000 to 2,000,000 (and preferably approximately 200,000 to 1,600,000) as polystyrene when determined by gel permeation chromatography (GPC). This weight average molecular weight can be measured with an ordinary GPC apparatus (a GPC device such as the Model HLC-8120GPC system manufactured by Tosoh Corp. using a TSKgel GMS-H(S) column. Furthermore, the above-mentioned proportion of the solvent-insoluble fraction and the weight average molecular weight of the solvent-insoluble fraction can be set arbitrarily by, for example, suitably adjusting the ratio of functional group-containing monomer component to the total amount of monomer component, the type and ratio of chain transfer agent, or the type and ratio of crosslinking agent and the like.

The PSA sheet disclosed herein is characterized in that the amount of sulfur-containing gas released in a gas generation test in which the PSA sheet is heated for 1 hour at 85° C. is 0.043 µg $SO_4^{2-}$/cm$^2$ or less (preferably 0.03 µg $SO_4^{2-}$/cm$^2$ or less and more preferably 0.02 µg $SO_4^{2-}$/cm$^2$ or less). From the viewpoint of preventing metal corrosion, the amount of sulfur-containing gas released from the PSA sheet is preferably as far below the above-mentioned values as possible. Consequently, it is preferable to avoid use or reduce the amount used of materials able to become generation sources of sulfur-containing gas used for the materials that compose the PSA sheet disclosed herein as well as materials used in the production process thereof with respect to not only the chain transfer agent used to synthesize the acrylic polymer, but also other materials as well. For example, it is preferable to select materials that are resistant to the generation of sulfur-containing gas with respect to materials other than the chain transfer agent used to synthesize the acrylic polymer (such as an emulsifier or polymerization initiator), tackifier resin, emulsifier and various other additives able to be contained in the tackifier resin, crosslinking agent, various additives able to be incorporated in the aqueous dispersion type PSA composition, and the substrate of the PSA sheet and additives thereof. As a result, the metal corrosion preventability of the PSA sheet can be further enhanced while ensuring favorable adhesion performance by using a chain transfer agent. In a preferable aspect thereof, the amount of sulfur-containing gas released from the PSA sheet in the above-mentioned gas generation test that is attributable to materials other than the chain transfer agent (namely, the amount of sulfur-containing gas generated derived from materials other than the chain transfer agent) is essentially zero.

The art disclosed herein can be applied to prevention of corrosion of various types of metals able to be transformed (such as the formation of sulfide) by reacting with sulfur-containing gas (such as $H_2S$ or $SO_2$). Examples of such corrosion-susceptible metals include transition metals such as silver, copper, titanium, chromium, iron, cobalt, nickel or zinc, and metals included in representative elements such as aluminum, indium, tin or lead. Particularly preferable examples of corrosion-susceptible metals include silver and silver alloys (alloys consisting mainly of silver) due to their susceptibility to corrosion by sulfur-containing gas and their wide use as constituent materials of boards and wires. According to a preferable embodiment of the PSA sheet disclosed herein, in the case of arranging 1.0 g of the PSA sheet (containing a PSA layer and substrate but not containing a release liner) and a silver plate in a sealed space having a volume of 50 mL while in a non-contact state and storing at 85° C. for 1 week, metal corrosion preventability can be realized to a degree that changes in appearance (such as a decrease or loss of metal luster or coloration such as darkening) indicating corrosion are not observed on the silver plate.

According to the PSA sheet disclosed herein, metal corrosion and problems incidental thereto (such as defective contact or decreased appearance quality) can be reliably prevented or inhibited by effectively inhibiting release of sulfur-containing gas in the manner described above. Consequently, the above-mentioned PSA sheet can be preferably used for the purpose of, for example, bonding components, protecting surfaces, displaying information, sealing or filling openings and gaps or cushioning vibrations or impacts, in the cases of televisions (such as liquid crystal televisions, plasma televisions or cathode ray tube televisions), computers (such as displays or cabinets), audio equipment, and various other home appliances or OA equipment. It is particularly preferable as a PSA sheet used in environments where temperature inside a case rises easily due to use of electronic equipment (such as inside the case of a liquid crystal television), thereby promoting generation of sulfur-containing gas and metal corrosion. According to the PSA sheet disclosed herein, a high degree of metal corrosion preventability can be demonstrated in these modes of use as well.

Since the PSA sheet disclosed herein is provided with a PSA layer formed from a PSA composition containing an aqueous dispersion type acrylic polymer, and a sulfur-free chain transfer agent is used to synthesize the acrylic polymer, in addition to attaining a high level of metal corrosion preventability, the PSA sheet is able to demonstrate superior adhesion performance. Thus, this PSA sheet can be preferably used as a PSA sheet for bonding components required to exhibit high PSA performance within electronic equipment and other locations. In addition, the art disclosed herein can be preferably applied to, for example, a double-sided PSA sheet provided with a PSA layer on respective sides of a sheet-like substrate (and typically a non-woven fabric or other porous substrate). In the case of double-sided PSA sheets, it is important that the PSA layers be formed by adequately permeating into the substrate, and since these PSA sheets tend to be required to have high adhesion performance, being able to adjust molecular weight by using a chain transfer agent is particularly significant. Although there are no particular limitations thereon, the thickness of the PSA layers that compose a double-sided PSA sheet can be, for example, approximately 20 µm to 150 µm per side.

According to the present description, an aqueous dispersion type PSA composition (typically a composition that forms the above-mentioned PSA sheet by drying or curing), which contains an acrylic polymer synthesized using a sulfur-free chain transfer agent, is provided that imparts a PSA in which the amount of sulfur-containing gas released in a gas generation test as previously described is 2.7 µg $SO_4^{2-}$/g or less (more preferably 1.8 µg $SO_4^{2-}$/g or less, and for example, less than µg $SO_4^{2-}$/g). This PSA composition is preferable as a PSA composition for forming a PSA layer provided in any of the PSA sheets disclosed herein. In addition, since the above-mentioned PSA composition is able to form a PSA that releases only a small amount of sulfur-containing gas as previously described, it is preferable for applications in which a PSA (which may be in the form of a mass or other form without being limited to that of a sheet) that demonstrates a function such as sealing, filling or cushioning is formed within a case of electronic equipment or other location.

EXAMPLES

Although the following provides an explanation of several examples relating to the present invention, the present invention is not intended to be limited to these examples. Furthermore, in the following explanation, the terms "parts" and "%" are based on weight unless specifically indicated otherwise.

Example 1

40 parts of ion exchange water was placed in a reaction vessel equipped with a condenser, nitrogen feed tube, thermometer and stirrer, and the inside of the reaction vessel was replaced with nitrogen by introducing nitrogen gas while stirring for more than 1 hour at 60° C. 0.1 part of 2,2'-azobis [2-(5-methyl-2-imidazolin-2-yl)propane]dihydrochloride (polymerization initiator) was added to the reaction vessel. A monomer emulsion was gradually added dropwise over the course of 4 hours while holding the system at 60° C. to allow the emulsion polymerization reaction to proceed. The monomer emulsion used was obtained by adding 85 parts of 2-ethylhexyl acrylate, 13 parts of methyl acrylate, 1.25 parts of acrylic acid, 0.75 part of methacrylic acid, 0.8 part of 2,3-dimethyl-2-butene (chain transfer agent), 0.02 part of γ-methacryloxypropyl trimethoxysilane ("KBM-503", Shin-Etsu Chemical Co., Ltd.) and 2 parts of sodium polyoxyethylene lauryl sulfate (emulsifier) to 30 parts of ion exchange water followed emulsification. After finishing the addition of the monomer emulsion, the system was further stored for 3 hours at 60° C. followed by the addition of 0.2 part of hydrogen peroxide and 0.6 part of ascorbic acid. After allowing the system to cool to room temperature, the pH was adjusted to 7 by adding 10% aqueous ammonia to obtain an acrylic polymer emulsion (aqueous dispersion type acrylic polymer).

20 parts as solid fraction of a tackifier resin emulsion ("E-865NT", Arakawa Chemical Industries Co., Ltd.) was added per 100 parts by weight of the acrylic polymer contained in the above-mentioned acrylic polymer emulsion. Moreover, pH was adjusted to 7.2 and viscosity was adjusted to 10 Pa·s, using 10% aqueous ammonia as pH adjuster and polyacrylic acid ("Aron B-500", Toagosei Co. Ltd.) as thickener. Furthermore, viscosity was measured using a B-type viscometer with a No. 5 rotor under conditions of a rotating speed of 20 rpm, temperature of 30° C. and measuring time of 1 minute. An aqueous dispersion type acrylic PSA composition as claimed in the present example was obtained in this manner.

The above-mentioned PSA composition was coated onto a release liner having a release treatment layer obtained with a silicone-based release agent ("SLB-80WD(V2)", Sumikakakoushi Co., Ltd.) followed by drying for 2 minutes at 100° C. to form a PSA layer having a thickness of about 60 μm. Two of these release liner with PSA layers were prepared, and the PSA layers were respectively affixed to both sides of a nonwoven fabric substrate ("SP-14K", Daifuku Paper Mfg. Co., Ltd., basis weight: 14 g/m²) to produce a PSA sheet. Both adhesive sides of this PSA sheet were protected by the release liner used when producing the PSA sheet.

Example 2

In this example, 0.28 part of 1,5-cyclooctadiene was used as chain transfer agent instead of the 2,3-dimethyl-2-butene used in Example 1. An acrylic polymer emulsion was obtained in the same manner as Example 1 with respect to other aspects of the example, a PSA composition was obtained using this emulsion in the same manner as Example 1, and the composition was used to produce a PSA sheet.

Example 3

In this example, 0.7 part of N,N-diethylaniline was used as chain transfer agent instead of the 2,3-dimethyl-2-butene used in Example 1. An acrylic polymer emulsion was obtained in the same manner as Example 1 with respect to other aspects of the example, a PSA composition was obtained using this emulsion in the same manner as Example 1, and the composition was used to produce a PSA sheet.

Example 4

In this example, 0.5 part of cinnamyl aldehyde was used as chain transfer agent instead of the 2,3-dimethyl-2-butene used in Example 1. An acrylic polymer emulsion was obtained in the same manner as Example 1 with respect to other aspects of the example, a PSA composition was obtained using this emulsion in the same manner as Example 1, and the composition was used to produce a PSA sheet.

Example 5

In this example, 0.33 part of lauryl mercaptan was used as chain transfer agent instead of the 2,3-dimethyl-2-butene used in Example 1. An acrylic polymer emulsion was obtained in the same manner as Example 1 with respect to other aspects of the example, a PSA composition was obtained using this emulsion in the same manner as Example 1, and the composition was used to produce a PSA sheet.

The following measurements or evaluations were carried out on each of the PSA sheets obtained in each of the above examples. Those results are shown in Table 1. The types of chain transfer agents used during emulsion polymerization in each example are also shown in the table. In addition, the gel fraction and swelling degree of the acrylic polymer as claimed in each example were measured using the previously described methods. Those results are also shown in Table 1.

<Measurement of ABS Adhesive Strength>

A release liner covering one of the adhesive sides of a double-sided PSA sheet was peeled off and the PSA sheet was backed with a polyethylene terephthalate (PET) film having a thickness of 25 μm by affixing thereto. The backed PSA sheet was cut to a size measuring 20 mm wide and 100 mm long for use as a measurement sample. The release liner was peeled from the other adhesive side of the above-mentioned sample, and the sample was pressed onto an ABS sheet as an adherend ("Kobe Poly-sheet ABS Sheet", Shin-Kobe Electric Machinery Co.) by passing a 2 kg roller back and forth over the sample. After holding the sample at 23° C. for 30 minutes, the 180° peel strength with respect to an ABS sheet was measured using a tensile testing machine in compliance with JIS Z 0237 in a measuring environment at a temperature of 23° C. and RH of 50% and under conditions of a pulling speed of 300 min/min.

<Measurement of PP Adhesive Strength>

The 180° peel strength with respect to PP was measured in the same manner as measurement of ABS adhesive strength described above with the exception of using a PP sheet as an adherend ("Kobe Poly-sheet Polypropylene Sheet", Shin-Kobe Electric Machinery Co.).

<Measurement of 80° Cohesive Strength>

Cohesive strength was measured using a creep tester. Namely, a release liner covering one of the adhesive sides of a double-sided PSA sheet was peeled off and the PSA sheet was backed with a PET film having a thickness of 25 μm by affixing thereto. This backed PSA sheet was cut to a width of 10 mm to produce a test piece. A release liner was peeled from the other adhesive side of the test piece, and the test piece was affixed to a Bakelite sheet as an adherend over a contact surface area measuring 10 mm wide and 20 mm long. After allowing the test piece to stand for 30 minutes in an environment at 80° C., the Bakelite sheet was suspended and a load of 500 g was applied to the free end of the test piece. The test piece was allowed to stand for 1 hour in an environment at 80° C. with the load applied thereto in compliance with JIS Z 0237, and the time until the test piece fell was measured in the case the test piece fell in less than 1 hour, or the distance (mm) the test piece shifted from the initially affixed position was measured in the case the test piece was still affixed to the adherend without falling even after 1 hour.

<Evaluation of Curved Surface Adhesion>

A double-sided PSA sheet was cut to a size measuring 10 mm wide and 90 long, a release liner covering one of the adhesive sides thereof was peeled off, and a piece of aluminum cut to the same size (thickness: 0.5 mm) was affixed thereto to back the PSA sheet and produce a test piece. After allowing the test piece to stand for 1 day in an environment at 23° C. and 50% RH, it was wrapped around a cylindrical column having a diameter of 40 mm (with the piece of aluminum on the inside), and bent into the shape of an arc by pressing onto the cylindrical column for about 5 seconds. A release liner was peeled from the other adhesive side of the test piece and the test piece was pressed onto a polypropylene sheet using a laminator. After allowing to stand for 24 hours in an environment at 23° C. and 50% RH and then heating for 2 hours at 70° C., the distance (mm) the ends of the test piece lifted up from the surface of the polypropylene sheet was measured. The results of the curved surface adhesion test shown in Table 1 represent the average value of lifting distance of both ends.

<Evaluation of Foam Repulsion Resistance>

A release liner covering one adhesive side of a double-sided PSA sheet was peeled off, the PSA sheet was affixed (to urethane form having a thickness of 10 mm ("ECS Foam", Inoac Corp.) with a laminator (lamination rate: 0.5 m/min, pressure: 0.3 MPa), and the laminated PSA sheet was cut to a size of 10 mm wide and 50 mm long to product a test piece. After allowing this test piece to stand for 1 day in an environment at 23° C. and 50% RH, a release liner was peeled from the other adhesive side of the test piece, and the test piece was pressed onto the end of one side of an ABS sheet having a thickness of 2 mm by passing a 2 kg roller back and forth over the test piece so that the adhered area was 10 mm wide and 10 mm long. Next, the remaining portion of the test piece (width: 10 mm, length: 40 mm) was affixed to the other side of the ABS sheet by bending by about 180°. After allowing the test piece to stand for 24 hours in an environment at 23° C. and 50% RH and further stand for 2 hours in an environment at 70° C., the distance the end of the test piece lifted up from the one side of the ABS sheet (side at which the adhered surface area was 10 mm wide and 10 mm long) was measured.

<Measurement of Amount of Sulfur-Containing Gas Released>

About 0.1 g of each PSA sheet from which release liners had been peeled from both adhesive sides was placed in a sample boat for a combustion apparatus, and heated for 1 hour at 85° C. using a combustion apparatus (Model "AQF-100" Automated Sample Combustion System, Dia Instruments). Gas generated from the PSA sheet at this time was allowed to pass through 10 mL of an absorbent liquid. This absorbent liquid contains 30 ppm of hydrogen peroxide in pure water, and is able to capture sulfur-containing gas (such as $H_2S$ or $SO_2$) contained in the generated gas by converting to $SO_4^{2-}$. Pure water was added to the absorbent liquid after the generated gas had passed there through to adjust to a volume of 20 mL, and the amount of $SO_4^{2-}$ generated per 1 g of PSA sheet was determined by carrying out quantitative analysis of $SO_4^{2-}$ using an ion chromatograph ("DX-320", Dionex Corp.). Furthermore, the same procedure was carried out using the empty sample boat as a blank. The results obtained were converted to the amount of $SO_4^{2-}$ generated per surface area of each PSA sheet and the amount of $SO_4^{2-}$ generated per 1 g of PSA. Those results are shown in Table 1. Furthermore, the above-mentioned conversions were carried out using a value of 0.017 g for the weight per 1 $cm^2$ of the PSA sheet of each example, and a value of 0.0156 g for the weight of the PSA contained in 1 $cm^2$ of each PSA sheet.

[Operating Conditions of Automated Sample Combustion System]

Temperatures: inlet: 85° C., outlet: 85° C.
Gas flow rates: $O_2$: 400 mL/min, Ar (water supply unit: scale 0): 150 mL/min

[Ion Chromatograph (Anion) Measurement Conditions]

Separation column: IonPac AS18 (4 mm×250 mm)
Guard column: IonPac AG18 (4 mm×50 mm)
Removal system: ASRS-ULTRA (external mode, 75 mA)
Detector: Electrical conductivity detector
Eluents: 13 mM KOH (0 to 20 minutes)
30 mM KOH (20 to 30 minutes)
(using EG40 Eluent Generator)
Eluent flow rate: 1.0 mL/min
Sample injection volume: 250 μL <Metal Corrosion Test>

Figure 7:
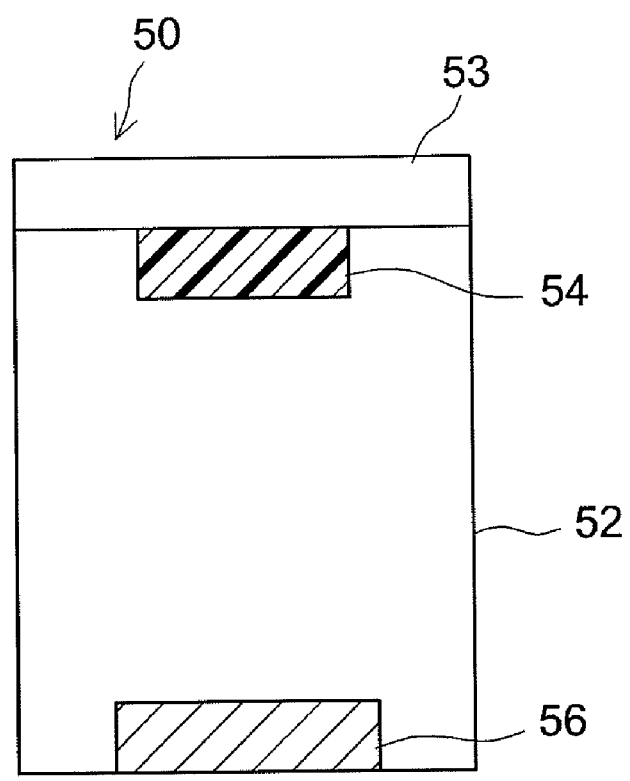
FIG. 7 is an explanatory drawing schematically showing a method for carrying out a metal corrosion test.

1.0 g of each PSA sheet from which release liners had been peeled from both adhesive sides (composed of a non-woven fabric substrate and PSA layers provided on both sides thereof) and a polished silver plate (silver purity: >99.95%, size: 1 mm×10 mm×10 mm) were prepared. Metal corrosiveness of the PSA sheets was evaluated using a metal corrosion tester 50 shown in FIG. 7. Namely, the above-mentioned PSA sheet 54 and the above-mentioned silver plate 56 were placed in a transparent glass screw-top bottle 52 having a volume of 50 mL so as not to make direct contact and sealing inside. More specifically, the silver plate 56 was placed on the bottom of the screw-top bottle 52, the PSA sheet 54 was affixed to the back of a screw-top bottle cover 53, and the cover 53 was screwed onto the screw-top bottle 52 to seal. This was then allowed to stand for 1 week at 85° C. The silver plate following completion of the test (after 1 week had passed) was compared with the unused silver plate (prior to the test), and metal corrosiveness was evaluated by visually confirming the presence or absence of corrosion (as determined by changes in appearance such as such as loss of metal luster or coloring). The results are indicated with "Yes" for metal corrosiveness in the case corrosion was observed, or with "No" for metal corrosiveness in the case corrosion was not observed.

TABLE 1

|  | Ex. 1 | Ex. 2 | Ex. 3 | Ex. 4 | Ex. 5 |
|---|---|---|---|---|---|
| Chain transfer agent | T1 | T2 | T3 | T4 | T5 |
| Gel fraction (%) | 46 | 50 | 49 | 49 | 48 |
| Swelling degree (%) | 37 | 36 | 29 | 43 | 34 |
| Adhesive strength vs. ABS (N/20 mm) | 16 | 17 | 15 | 15 | 16 |
| Adhesive strength vs. PP (N/20 mm) | 14 | 12 | 13 | 13 | 13 |
| 80° cohesive strength (mm) | 0.8 | 1.0 | 1.0 | 1.3 | 1.1 |
| Curved surface adhesion (mm) | 3.3 | 2.2 | 4.1 | 3.5 | 3.9 |
| Foam repulsion resistance (mm) | 0 | 0 | 0 | 0 | 0 |
| Amount of $SO_4^{2-}$ generated per 1 g PSA sheet (μg/g) | <1.1 | <1.1 | <1.1 | <1.1 | 2.7 |
| Amount of $SO_4^{2-}$ generated per 1 $cm^2$ PSA sheet (μg/g) | <0.02 | <0.02 | <0.02 | <0.02 | 0.045 |
| Amount of $SO_4^{2-}$ generated per 1 g PSA (μg/$cm^2$) | <1.2 | <1.2 | <1.2 | <1.2 | 2.9 |
| Metal corrosiveness | No | No | No | No | Yes |

T1: 2,3-dimethyl-2-butene
T2: 1,5-cyclooctadiene
T3: N,N-diethylaniline
T4: Cinnamyl aldehyde
T5: n-lauryl mercaptan As shown in the above table, according to the PSA sheets of Examples 1 to 4 using an acrylic polymer synthesized by emulsion polymerization using a sulfur-free chain transfer agent, the amount of sulfur-containing gas released was able to be reduced considerably in comparison with the PSA sheet of Example 5 that used an acrylic polymer synthesized using n-lauryl mercaptan for the chain transfer agent. In addition, in a metal corrosion test as well, in contrast to the surface of the silver plate having been discolored to a reddish-violet color in the case of the PSA sheet of Example 5, discoloration was not observed with the PSA sheets of Examples 1 to 4, and the PSA sheets of Examples 1 to 4 were confirmed to not demonstrate metal corrosiveness. The PSA sheets of Examples 1 to 4 demonstrated adhesion performance equal to or better than that of the PSA sheet of Example 5 with respect to ABS adhesive strength and cohesive strength. Moreover, the PSA sheets of Examples 1 to 4 also demonstrated PSA performance equal to or better than that of the PSA sheet of Example 5 with respect to PP adhesive strength, curved surface adhesion and foam repulsion resistance. In this manner, according to Examples 1 to 4, remarkable effects were realized in that metal corrosion preventability is improved considerably while maintaining PSA performance equal to that of Example 5. Particularly favorable results were obtained for the PSA sheet of Example 1, in which an acrylic polymer was used for which gel fraction and swelling degree had been adjusted to be within a range of ±3% of the values of Example 5.

Although the above has provided a detailed explanation of specific examples of the present invention, these examples are merely intended to be exemplary and do not limit the claims. The art described in the claims includes various modifications and alterations of the previously described specific examples.

What is claimed is:

1. A pressure-sensitive adhesive sheet in combination with an electronic device, wherein
    the pressure-sensitive adhesive sheet comprises a pressure-sensitive adhesive layer formed from an aqueous dispersion pressure-sensitive adhesive composition,
    the pressure-sensitive adhesive composition contains an aqueous dispersion acrylic polymer synthesized using a chain transfer agent not having sulfur as a component thereof,
    the pressure-sensitive adhesive sheet is bonded in an internal space of the electronic device where a metal material is present, and the pressure-sensitive adhesive sheet does not directly contact the metal material, and
    the pressure-sensitive adhesive sheet satisfies all of the following properties:
    (A) 180° peel strength on an acrylonitrile-butadiene-styrene copolymer resin sheet is 10 N/20 mm or more;
    (B) holding time in an 80° C. cohesive strength test is 1 hour or more;
    (C) an amount of gas containing sulfur, as a component, released in a gas generation test wherein the pressure-sensitive adhesive sheet is heated at 85° C. for 1 hour is 0.043 µg or less as $SO_4^{2-}$ per square centimeter ($cm^2$) of the pressure-sensitive adhesive sheet surface area;
    (D) in a metal corrosion test in which 1 g of the pressure-sensitive adhesive sheet and a silver plate are placed in a vessel having a volume of 50 mL so that the sheet and the plate mutually do not make contact, and in which the vessel is then sealed and stored for 1 week at 85° C., no corrosion of the silver plate occurs.

2. The pressure-sensitive adhesive sheet according to claim 1, wherein the following property is further satisfied:
    (E) 180° peel strength on a polypropylene resin sheet is 10 N/20 mm or more.

3. The pressure-sensitive adhesive sheet according to claim 1, wherein the following property is further satisfied:
    (F) in a curved surface adhesion test in which a test piece, obtained by backing a pressure-sensitive adhesive sheet having a width of 10 mm and length of 90 mm with an aluminum plate having a thickness of 0.5 mm, is wrapped around a cylindrical column having a diameter of 40 mm for 5 seconds to be bent on an aluminum plate side followed by pressing the test piece onto a polypropylene sheet and holding for 24 hours in an environment at 23° C. and 50% RH and then for 2 hours in an environment at 70° C., a distance that ends of the test piece lift from the surface of the polypropylene sheet is 8 mm or less.

4. The pressure-sensitive adhesive sheet according to claim 1, which is formed as a double-sided pressure-sensitive adhesive sheet provided with the adhesive layer on each side of a substrate.

5. The pressure-sensitive adhesive sheet according to claim 1, wherein the chain transfer agent is selected from the group consisting of N,N-dialkylanilines, compounds having a benzylidene group, non-conjugated cycloalkyldienes and 2,3-dimethyl-2-butene.

6. The pressure-sensitive adhesive sheet according to claim 1, wherein the electronic device has a casing, and the pressure-sensitive adhesive sheet is bonded within the casing of the electronic device.

7. The pressure-sensitive adhesive sheet according to claim 1, wherein the chain transfer agent is N,N-dimethylaniline, α-methylstyrene monomer, a compound having a benzylidene group, a hydroquinone, a quinone, a conjugated or non-conjugated olefin, an alcohol having a phenyl group, or a phenyl-substituted benzene.

* * * * *